United States Patent
Ganguli

(10) Patent No.: US 10,140,738 B1
(45) Date of Patent: Nov. 27, 2018

(54) SYSTEM AND METHOD FOR INTERPRETING MACHINE-LEARNING RESULTS

(71) Applicant: Palo Alto Research Center Incorporated, Palo Alto, CA (US)

(72) Inventor: Anurag Ganguli, Milpitas, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 14 days.

(21) Appl. No.: 15/605,618

(22) Filed: May 25, 2017

(51) Int. Cl.
*G06T 11/20* (2006.01)
*G06N 99/00* (2010.01)
*G06K 9/00* (2006.01)

(52) U.S. Cl.
CPC ........ *G06T 11/206* (2013.01); *G06K 9/00577* (2013.01); *G06N 99/005* (2013.01)

(58) Field of Classification Search
None
See application file for complete search history.

(56) References Cited

U.S. PATENT DOCUMENTS

| 2010/0040285 A1* | 2/2010 | Csurka | G06K 9/00624 |
| | | | 382/170 |
| 2012/0070074 A1* | 3/2012 | Liu | G06K 9/6257 |
| | | | 382/159 |
| 2017/0205537 A1* | 7/2017 | Yuan | G01W 1/10 |

* cited by examiner

*Primary Examiner* — Jeffrey Chow
(74) *Attorney, Agent, or Firm* — Shun Yao; Park, Vaughan, Fleming & Dowler LLP

(57) ABSTRACT

One embodiment provides a system for facilitating visualization of input data classifications. The system obtains, from a remote computer system, output data which includes a classification and a score that a corresponding set of input data belongs to one or more classifications. The system computes an objective function based on the score and the input data, and computes a gradient of the objective function based on the input data. In response to determining that the computed gradient is not greater than a predetermined threshold, the system perturbs the input data in a direction of or opposite to the computed gradient, and transmits the perturbed input data to the remote computer system to obtain new output data. The system displays on a device a visualization of whether the input data belongs more or less strongly to a classification.

20 Claims, 6 Drawing Sheets

SYSTEM AND METHOD FOR INTERPRETING MACHINE-LEARNING RESULTS

BACKGROUND

Field

This disclosure is generally related to interpreting results from a machine learning system. More specifically, this disclosure is related to a system and method for facilitating visualization of input data classifications from a machine learning system, such as for results in which test data points lie close to a boundary between classifications or classes.

Related Art

A machine learning system can be viewed as a mapping from a space of inputs X to a space of outputs Y. The space of inputs X can include, e.g., raw data or time series data collected by a set of sensors, images, patient medical data, and system log files. The space of inputs X may be continuous or discrete. The space of outputs Y is typically discrete and can represent a classification of the input. Exemplary outputs can include {Rain, Sunny}, {Dog/Cat}, or {Normal, Abnormal}. In some instances, the space of inputs X may be transformed into features, which can include statistical properties such as a maximum or minimum of a time series, or a number of edges in an image.

A machine learning system may be trained in a supervised manner using previously collected data X along with known classifications Y. Once trained, the machine learning system can take new data as input and predict the output. Examples of supervised learning algorithms include Random Forest, Support Vector Machine, and Decision Tree. A machine learning system may also be trained in an unsupervised manner, such as when classifications Y are not known or not available. Examples of unsupervised learning algorithms include clustering-based algorithms such as Kmeans.

Advances in machine learning have led to the development of systems whose outputs may be difficult for a user to interpret. For example, in random forests and deep neural networks, it may be challenging for a user to interpret why a certain input generated a certain output. In many cases, the machine learning system is already trained, and the user does not have access to details of the algorithm used to generate the output. In these cases, the machine learning system is akin to a "black box" to the user. However, the user may still need to interpret the output of this black box. Specifically, such interpretations may be important for test data points which do not belong very strongly to a class, that is, test data points which lie close to a boundary between classes.

SUMMARY

One embodiment provides a system for facilitating visualization of input data classifications. The system obtains, from a remote computer system, output data which includes a classification and a score that a corresponding set of input data belongs to one or more classifications. The system computes an objective function based on the score and the input data, and computes a gradient of the objective function based on the input data. In response to determining that the computed gradient is greater than a predetermined threshold, the system perturbs the input data in a direction of or opposite to the computed gradient, and transmits the perturbed input data to the remote computer system to obtain new output data. The system displays on a device a visualization of whether the input data belongs more or less strongly to a classification.

In some embodiments, in response to determining that the computed gradient is greater than the predetermined threshold, the system stores the perturbed input data in a sequence. In response to determining that the computed gradient is not greater than a predetermined threshold, the system returns the sequence to a user, which causes the user to visualize a transformation of the input data to determine which aspects of the input data most strongly affect the classification.

In some embodiments, the input data is perturbed based on one or more of: a predetermined step size; and a step size which decreases at every iteration based on a predetermined scheme.

In some embodiments, the objective function is further based on scaling a logarithmic function of a positive real-value vector with a length equal to a number of classifications, and wherein the score is a probability that the corresponding set of input data belongs to the one or more classifications.

In some embodiments, the remote computer system is a machine learning system or a black box machine learning system which provides classifications for the set of input data.

In some embodiments, the remote computer system provides classifications for images. The input data is an input image, the output data is an output image, and the visualization displayed on the device is of whether the input image belongs more or less strongly to the classification.

In some embodiments, in response to determining that the computed gradient is greater than the predetermined threshold, the system stores the perturbed input data in a sequence, wherein the stored sequence is a video comprised of multiple images based on the perturbed input data. The system plays the video by displaying on the device a transformation of the input image to an image which belongs more or less strongly to the classification. The system can also return the sequence to a user, which causes the user to visualize a transformation of the input image to determine which aspects of the input image most strongly affect the classification.

DETAILED DESCRIPTION

Figure 1:
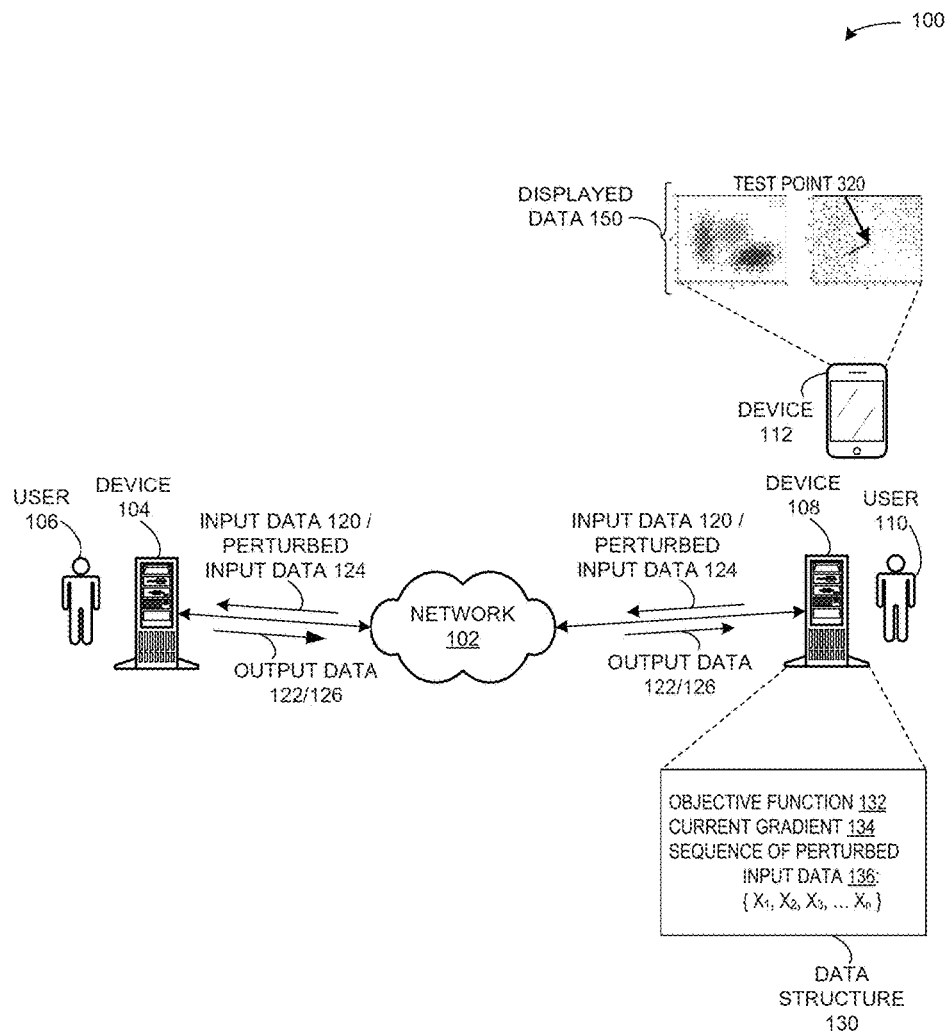
FIG. 1 illustrates an exemplary environment for facilitating visualization of input data classifications, in accordance with an embodiment of the present invention.

In the figures, like reference numerals refer to the same figure elements.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of allowing a user to interpret results from a machine learning system by facilitating visualization of input data classifications. A typical machine learning system may be trained to process training data (as input X) and generate trained or predicted data with a classification (as output Y). However, advances in machine learning have led to the development of systems whose outputs may be difficult for a user to interpret. For example, in random forests and deep neural networks, it may be challenging for a user to interpret why a certain input generated a certain output. In many cases, the machine learning system is already trained, and the user does not have access to details of the algorithm used to generate the output. In these cases, the machine learning system is akin to a "black box" to the user. However, the user may still need to interpret the output of this black box. Specifically, such interpretations may be important for test data points which do not belong very strongly to a class, that is, test data points which lie close to a boundary between classes.

Embodiments of the present invention address these issues by providing a system which facilitates visualization of input data classifications. The system obtains, from a remote computer system which is a machine learning classification system, output data which includes a classification(s) and a score (e.g., a probability) that the corresponding input data belongs to the classification(s). The system computes an objective function based on the probability and the input data, and further computes a gradient of the objective function. If the computed gradient is greater than a predetermined threshold, the system perturbs the input data by a small amount in a direction of or opposite to the computed gradient, stores the perturbed input data in a sequence, and transmits the perturbed input data to the remote computer system to obtain new output data. The system repeats these steps until the computed gradient is not greater than the predetermined threshold, at which point the system returns the sequence to the user, and displays on a device a visualization of whether the input data belongs more or less strongly to the classification. Thus, the system facilitates visualization of input data classifications, e.g., by causing a user to visualize a transformation of the input data to determine which aspects of the input data most strongly affect the classification.

Exemplary Environment and Communication

FIG. 1 illustrates an exemplary environment 100 for facilitating visualization of input data classifications, in accordance with an embodiment of the present invention. Environment 100 can include: a device 104 and an associated user 106; and a device 108, an associated user 110, and an associated (display) device 112. Devices 104 and 108 can communicate with each other via a network 102. Device 108 can store a data structure 130, which can include an objective function 132, a current gradient 134, and a sequence of perturbed input data 136, such as "$\{X_1, X_2, X_3, \ldots, X_N\}$."

During operation, device 104 can receive input data 120, which may be transmitted from device 108 or from another network device (not shown). Device 104 can act as a machine learning system, train input data 120 by using a classifier, and generate output data 122. Device 104 can transmit to device 108 output data 122 as well as a probability (or score) that input data 120 belongs to a certain classification(s). Device 108 can initialize objective function 132 and sequence 136. Device 108 can then perform objective function 132, which can be based on input data 120 and the outputted probability from device 104. Device 108 can compute current gradient 134 based on input data 120, and perturb input data 120 in the direction of or opposite to the computed gradient 134, to obtain perturbed input data 124. Device 108 can store the perturbed input data 124 in input data sequence 136.

Subsequently, device 108 can transmit perturbed input data 124 to device 104, which can repeat the operation of using the classifier on the input data (i.e., perturbed input data 124). Device 104 can generate output data 126, and can further transmit output data 126 to device 108. These operations can repeat until the computed gradient 134 is not greater than a predetermined threshold, at which time device 108 can display (e.g., for user 110 on device 112) displayed data 150, which can correspond to the exemplary training data and transformed input data described below in relation to FIG. 3A.

Method for Facilitating Visualization of Input Data Classifications

Figure 2:
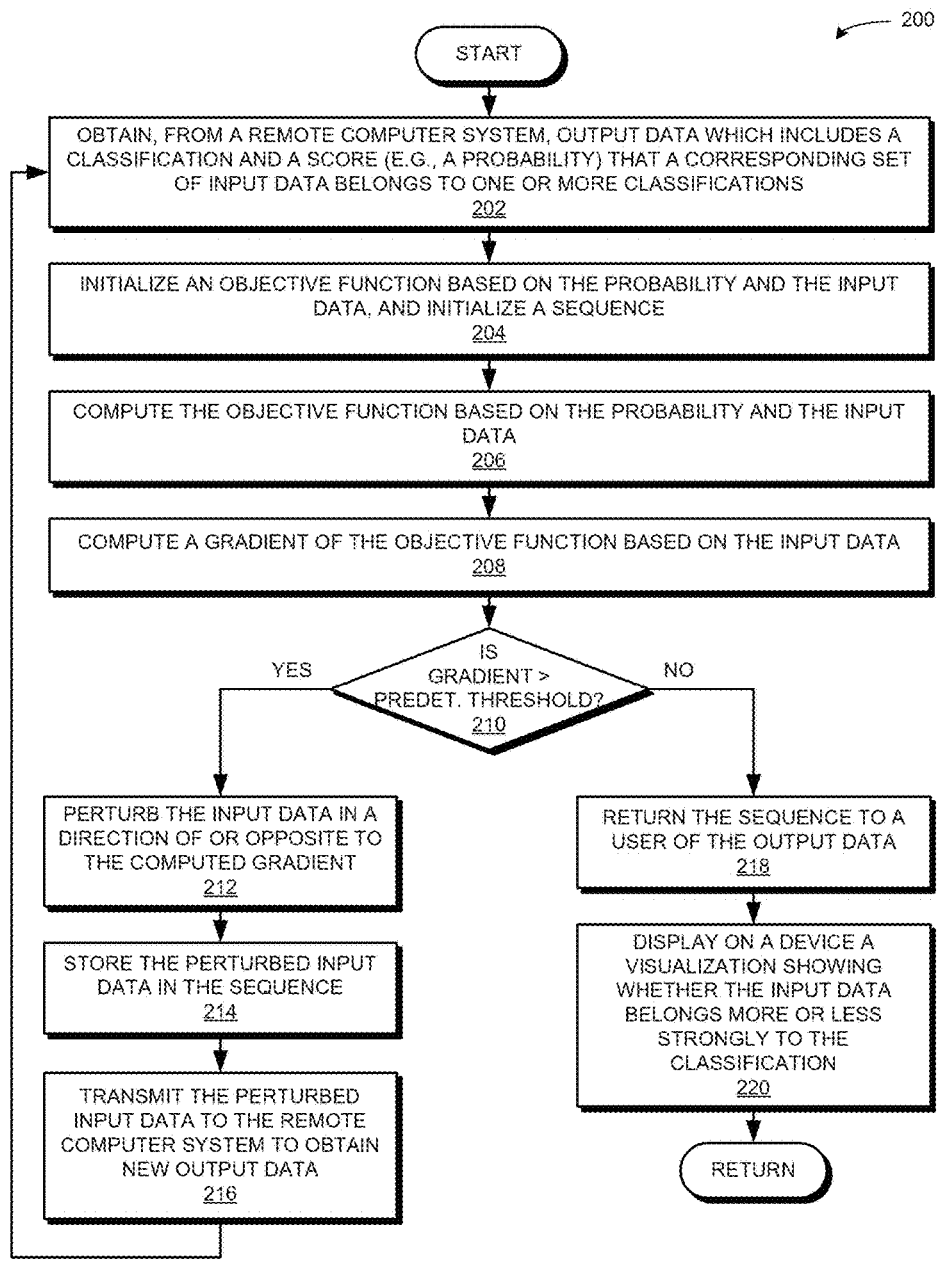
FIG. 2 presents a flow chart illustrating a method for facilitating visualization of input data classifications, in accordance with an embodiment of the present invention.

FIG. 2 presents a flow chart 200 illustrating a method for facilitating visualization of input data classifications, in accordance with an embodiment of the present invention. During operation, the system obtains, from a remote computer system, output data which includes a classification and a score (e.g., a probability) that a corresponding set of input data belongs to one or more classifications (operation 202). The system initializes an objective function based on the probability and the input data, and the system initializes a sequence (operation 204).

For example, the remote computer system can be a machine learning system, which can take input X and can output Y along with the probabilities (or scores) P of input X belonging to the various possible classes. If Y can belong to one of N possible classes, then P can be a positive real-valued vector of length N. Assume that J is an objective function mapping P to a positive real value. An exemplary objective function J can be:

$$J = \sum_{i=0}^{N} -P_i \log P_i \qquad \text{Equation (1)}$$

The term $P_i$ refers to the probability of the input belonging to class i. Note that $P_i$ is a function of input data X. The system can initialize the gradient of J (e.g., grad(J)) to a large number, and can further initialize or set a sequence to an empty set (e.g., $X_{seq} = \{\ \}$).

The system computes the objective function based on the probability and the input data (operation 206), and further computes a gradient of the objective function (e.g., grad(J))

based on the input data (operation 208). The system determines whether the computed gradient is greater than a predetermined threshold (decision 210). If it is, the system perturbs the input data in a direction of or opposite to the computed gradient (operation 212). For example, the system can calculate the perturbed input data $X_p$ as follows:

$$X_p = X + (\text{direction\_sign} * \text{step\_size} * \text{grad}(J)) \quad \text{Equation (2)}$$

The term direction_sign can be a positive or a negative, and corresponds, respectively, to the direction of or opposite to the computed gradient. The term step_size refers to a small predetermined step size, and can be used to iterate a transformation to the pre-determined threshold. The step size may also decrease at every iteration based on a predetermined scheme.

The system stores the perturbed input data in the sequence (operation 214) (e.g., by appending $X_p$ to $X_{seq}$), and transmits the perturbed input data (e.g., $X_p$) to the remote computer system to obtain new output data. The system iterates through operations 202, 204, 206, and 208 until the computed gradient is no longer greater than the predetermined threshold. In some embodiments, the system does not perform operation 204 during the iteration because the objective function is already initialized. In such cases, the system computes the objective function based on the output data which includes the classification and the probability that the corresponding set of input data (i.e., the perturbed input data) belongs to one or more classifications. That is, the system may only initialize the objective function and the sequence once for a given set of original input data.

If the system determines that the computed gradient is not greater than a predetermined threshold (decision 210), the system returns the sequence (e.g., $X_{seq}$) to a user of the output data (operation 218). The system displays on a device a visualization showing whether the input data belongs more or less strongly to the classification (operation 220), and the operation returns. Exemplary visualizations are described below in relation to FIGS. 3A and 3B.

Thus, the system iterates through the operations of computing the objective function and computing the gradient for sequentially perturbed input data and output classifications until a certain predetermined threshold is met. The system then displays on a device (e.g., of a user of the system) a visualization showing the transformed input data, which causes the user to determine whether the input data belongs more or less strongly to the classification. Furthermore, the system can cause the user to visualize a transformation of the input data, which allows the user to determine which aspects of the input data most strongly affect the classification, as described below in relation to FIGS. 3A and 3B.

Exemplary Visualizations of Input Data Classifications

Figure 3A:
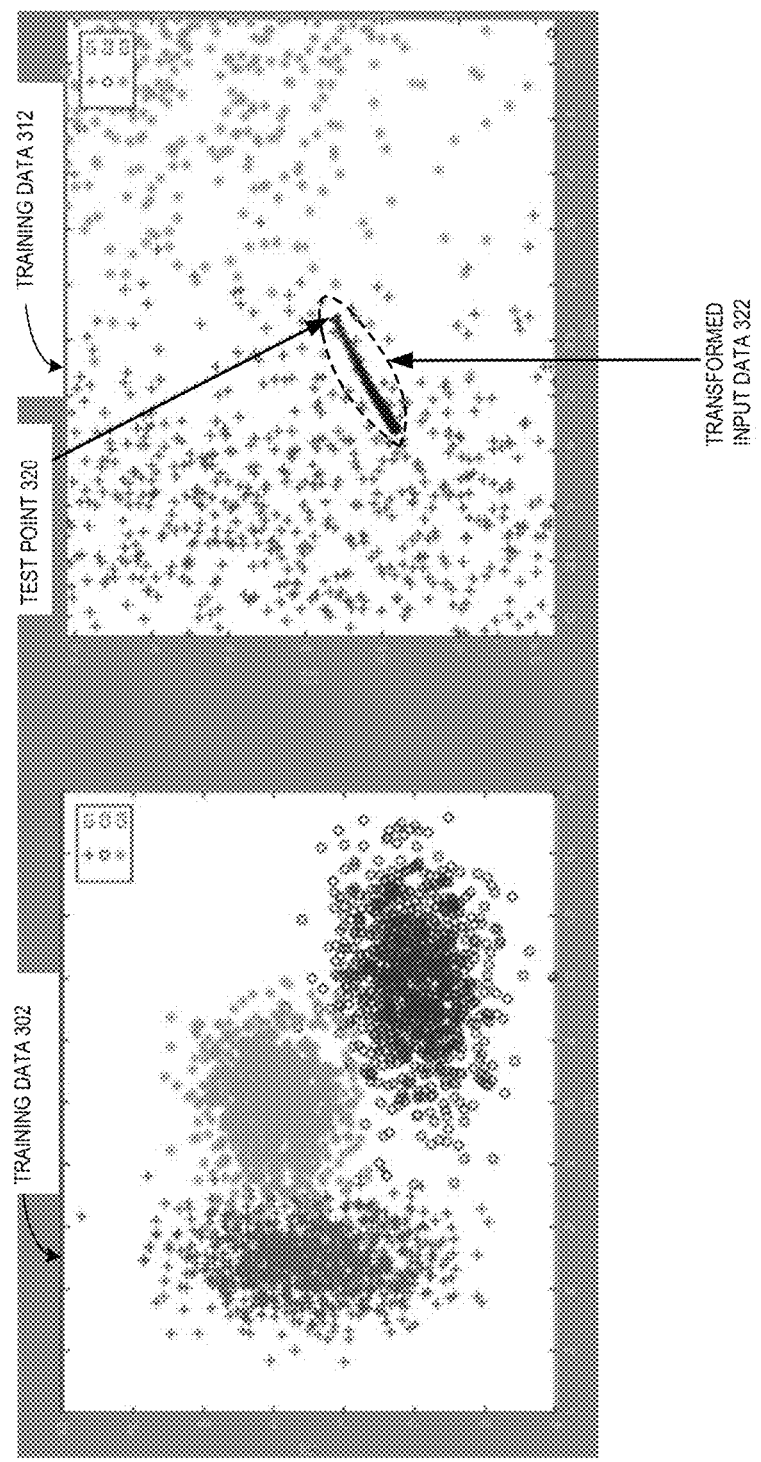
FIG. 3A illustrates exemplary training data indicating test input data and corresponding transformed input data, in accordance with an embodiment of the present invention.

FIG. 3A illustrates exemplary training data indicating test input data and corresponding transformed input data, in accordance with an embodiment of the present invention. Training data 302 illustrates training data which belongs to three classes (C1, C2, and C3), where the data belongs to a two dimensional real-valued space. The system trains a naive Bayers classifier on the data, which results in training data 312. Training data 302 and 312 can include an x-axis which measures a characteristic or dimension of "X1" and a y-axis which measures a characteristic or dimension of "Y1." Training data 312 includes a test point 320 which is initially classified into C1. By applying the method described above in relation to FIG. 2 with a direction_sign equal to "−1," the system returns or generates a sequence of points, which is shown as transformed input data 322. Transformed input data 322 includes the iteratively perturbed input data which is stored in the sequence, as in operation 214 of FIG. 2. Furthermore, by using a direction sign of "−1," the system perturbs X in the direction opposite to the gradient, i.e., such that the objective function decreases.

As described above, a user of the system may not have access to training data 302, and the user may not be aware of the type of algorithm used in training data 302 which results in training data 312. The user may only be able to generate the sequence depicted in FIG. 3A (i.e., transformed input data 322). The system thus causes the user to visualize the transformation, and provides the user with an understanding of why the classifier chose to categorize the test point into C1. In this example, the sequence moves primarily in the direction of the X1 dimension, which implies that the classifier is primarily using X1 to distinguish C1 from other data points. This allows the user to visualize the sequence, which depicts what it would take for the test data to belong more strongly into C1.

Figure 3B:
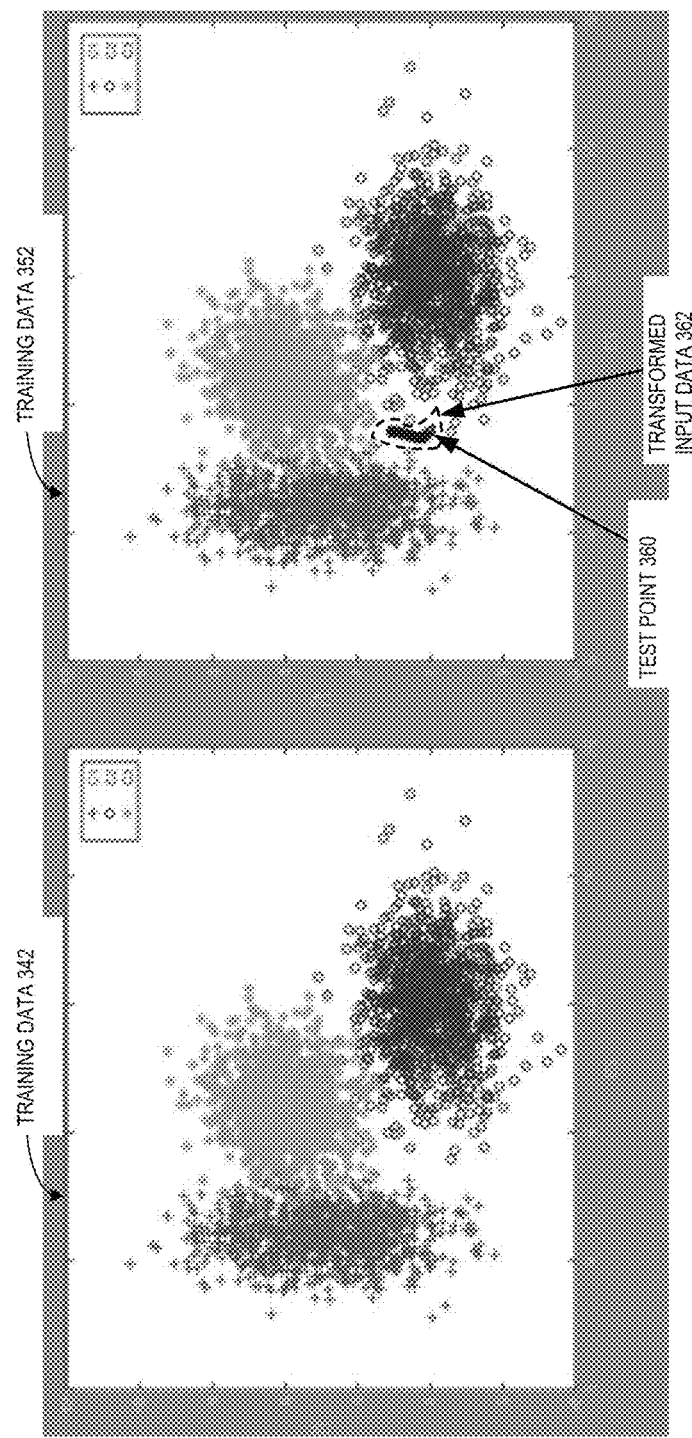
FIG. 3B illustrates exemplary training data indicating test input data and corresponding transformed input data, in accordance with an embodiment of the present invention.

FIG. 3B illustrates exemplary training data indicating test input data and corresponding transformed input data, in accordance with an embodiment of the present invention. Training data 342 illustrates training data which belongs to three classes (C1, C2, and C3), where the data belongs to a two dimensional real-valued space. The system trains a naive Bayers classifier on the data, which results in training data 352. Training data 342 and 352 can include an x-axis which measures a characteristic or dimension of "X1" and a y-axis which measures a characteristic or dimension of "Y1." Training data 352 includes a test point 360 which is initially classified into C2. By applying the method described above in relation to FIG. 2 with a direction_sign equal to "+1," the system returns or generates a sequence of points, which is shown as transformed input data 362. Transformed input data 362 includes the iteratively perturbed input data which is stored in the sequence, as in operation 214 of FIG. 2. Furthermore, by using a direction sign of "+1," the system perturbs X in the direction of the gradient, i.e., such that the objective function increases.

Thus, by allowing the user to generate the sequence depicted in FIG. 3B (i.e., transformed input data 362), the system causes the user to visualize the transformation, and provides the user with an understanding of why the classifier chose to categorize the test point into C2. In this example, the sequence moves primarily in a direction that traces the boundary between the classes. This allows the user to visualize the sequence, which depicts what it would take for the test data to belong less strongly to C2.

Method for Facilitating Visualization of Input Data Classifications for Images

Figure 4:
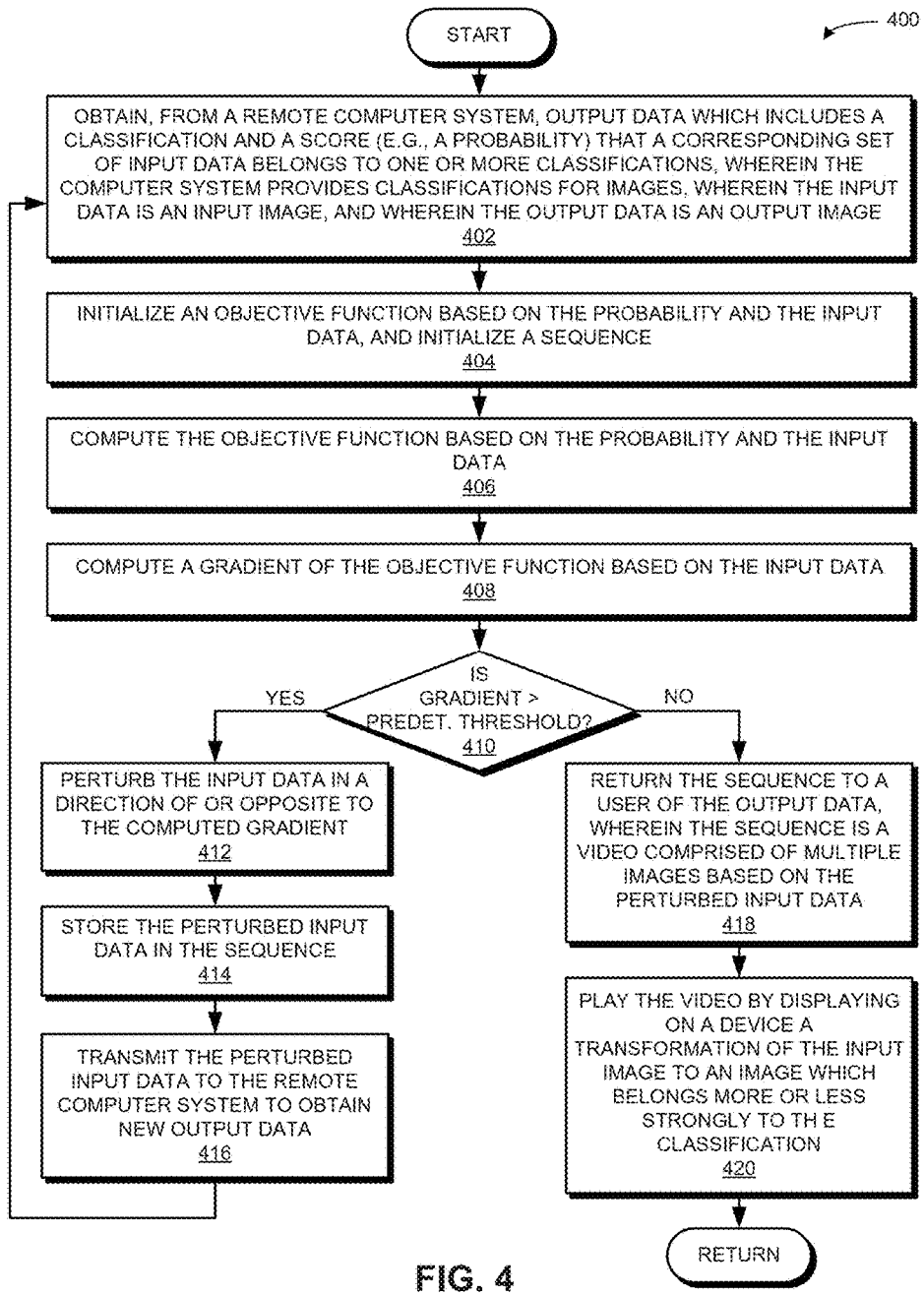
FIG. 4 presents a flow chart illustrating a method for facilitating visualization of input data classifications for input images, in accordance with an embodiment of the present invention.

FIG. 4 presents a flow chart 400 illustrating a method for facilitating visualization of input data classifications for input images, in accordance with an embodiment of the present invention. During operation, the system obtains, from a remote computer system, output data which includes a classification and a score (e.g., a probability) that a corresponding set of input data belongs to one or more classifications, wherein the remote computer system provides classifications for images, wherein the input data is an input image, and wherein the output data is an output image (operation 402). The system initializes an objective function based on the probability and the input data, and the system initializes a sequence (operation 404). The system computes the objective function based on the probability and the input data (operation 406), and further computes a gradient of the objective function (e.g., grad(J)) based on the input data (operation 408).

The system determines whether the computed gradient is greater than a predetermined threshold (decision 410). If it is, the system perturbs the input data in a direction of or opposite to the computed gradient (operation 412). The system stores the perturbed input data in the sequence (operation 414) (e.g., by appending $X_p$ to $X_{seq}$), and transmits the perturbed input data (e.g., $X_p$) to the remote computer system to obtain new output data. The system iterates through operations 402, 404, 406, and 408 until the computed gradient is no longer greater than the predetermined threshold. As described above in relation to FIG. 2, the system may only initialize the objective function and the sequence once for a given set of original input data.

If the system determines that the computed gradient is not greater than a predetermined threshold (decision 410), the system returns the sequence (e.g., $X_{seq}$) to a user of the output data, wherein the sequence is a video comprised of multiple images based on the perturbed input data (operation 418). This can cause the user to visualize a transformation of the input image to determine which aspects of the input image most strongly affect the classification. The system plays the video by displaying on a device a transformation (e.g., a visualization) of the input image to an image which belongs more or less strongly to the classification (operation 420), and the operation returns. That is, the visualization displayed on the device is of whether the input image belongs more or less strongly to the classification. Playing the video is one example of causing the visualization of the transformed input data. Other visualization methods are possible, including displaying information on a three-dimensional viewing glass or other medium. Exemplary visualizations are described above in relation to FIGS. 3A and 3B.

As another example, assume that the machine learning system (i.e., the remote computer system) is an image classification system which uses object recognition technology to determine a classification for an image. Given an input image of a person holding a violin, the machine learning system may output a classification or a label of "violinist" for the input image. However, the user may wish to understand why the machine learning system classified the input image in this way, i.e., what aspects of the image result in a classification of violinist. The system can generate a series of perturbed input images which, when displayed as a video, can indicate to the user whether the input image belongs more or less strongly to a classification. For example, the system can perturb the input data in a direction opposite to the computed gradient (by using a direction_sign of "−1" where the objective function would decrease). Each perturbed input image may appear as a person holding a violin, where the violin in the image becomes more pronounced. Assuming that the boundary between classifications is a boundary between classifications of "humans" and "violinists," the system can play a video or display a series of images comprising the perturbed input images. This allows the user to visualize what it would take for the input image to belong more strongly to, e.g., the class of violinists. In contrast, the system can perturb the input data in a direction of the computed gradient (by using a direction_sign of "+1" where the objective function would increase). In this case, each perturbed image may appear as a person holding a violin, where the violin in the image becomes less pronounced, e.g., becomes lighter in appearance, until it almost disappears. This allows the user to visualize what it would take for the input image to belong less strongly to, e.g., the class of violinists, and more strongly to the class of humans.

Exemplary Computer and Communication System

Figure 5:
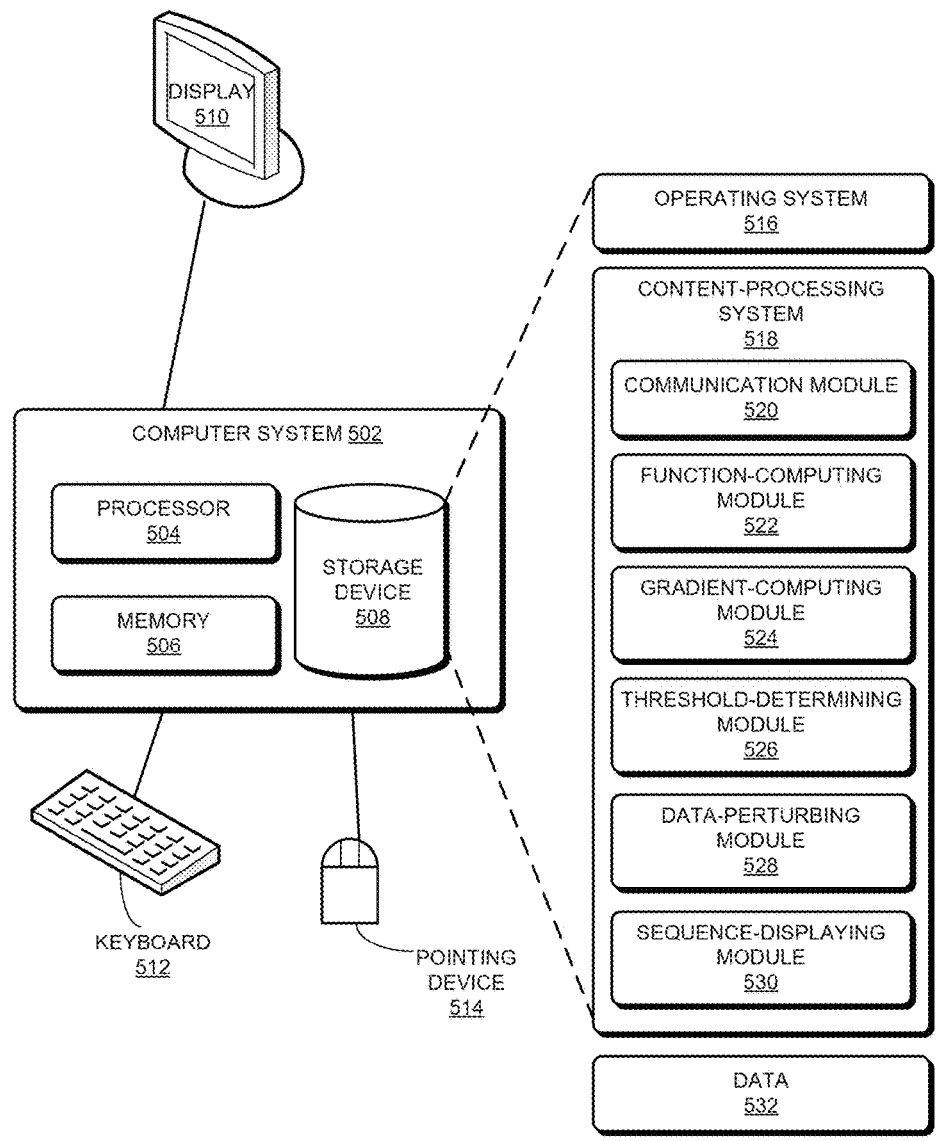
FIG. 5 illustrates an exemplary distributed computer and communication system that facilitates visualization of input data classifications, in accordance with an embodiment of the present invention.

FIG. 5 illustrates an exemplary distributed computer and communication system 502 that facilitates visualization of input data classifications, in accordance with an embodiment of the present invention. Computer system 502 includes a processor 504, a memory 506, and a storage device 508. Memory 506 can include a volatile memory (e.g., RAM) that serves as a managed memory, and can be used to store one or more memory pools. Furthermore, computer system 502 can be coupled to a display device 510, a keyboard 512, and a pointing device 514. In some embodiments, computer system 502 can be part of a mobile computing device, such as a smartphone, a mobile phone, a tablet, a three-dimensional viewing glass, or any other mobile computing device. Storage device 508 can store an operating system 516, a content-processing system 518, and data 532.

Content-processing system 518 can include instructions, which when executed by computer system 502, can cause computer system 502 to perform methods and/or processes described in this disclosure. Specifically, content-processing system 518 may include instructions for sending and/or receiving data packets to/from other network nodes across a computer network, such as a star network (communication module 520). A data packet can include a message that indicates output data which includes a classification and a score (e.g., a probability) that a corresponding set of input data belongs to one or more classifications, or that indicates input data (or perturbed input data).

Content-processing system 518 can include instructions for obtaining, from a remote computer system, output data which includes a classification and a score that a corresponding set of input data belongs to one or more classifications (communication module 520). Content-processing system 518 can also include instructions for computing an objective function based on the score and the input data (function-computing module 522). Content-processing system 518 can include instructions for computing a gradient of the objective function based on the input data (gradient-computing module 524). Content-processing system 518 can further include instructions for, in response to determining that the computed gradient is greater than a predetermined threshold (threshold-determining module 526), perturbing the input data in a direction of or opposite to the computed gradient (data-perturbing module 528) and transmitting the perturbed input data to the computer system to obtain new output data (communication module 520). Content-processing system 518 can include instructions for displaying on a device a visualization of whether the input data belongs more or less strongly to the classification (sequence-displaying module 530).

Furthermore, content-processing system 518 can include instructions for storing the perturbed input data in a sequence (sequence-displaying module 530). Content-processing system 518 can include instructions for, in response to determining that the computed gradient is not greater than the predetermined threshold (threshold-determining module 526), returning the sequence to a user (communication module 520), which causes the user to visualize a transformation of the input data to determine which aspects of the input data most strongly affect the classification (sequence-displaying module 530). Content-processing system 518 can also include instructions for playing a video (comprised of multiple images based on the perturbed input data) by displaying on the device a transformation of the input image to an image which belongs more or less strongly to the classification (sequence-displaying module 530).

Data 532 can include any data that is required as input or that is generated as output by the methods and/or processes described in this disclosure. Specifically, data 532 can store at least: output data; a classification; a probability; a score; a corresponding set of input data; an indication of a classification and a probability or a score that a corresponding set of input data belongs to one or more classifications; an objective function; a computed objective function; a gradient; a computed gradient of the objective function; a predetermined threshold; an indicator of whether a computed gradient is greater than the predetermined threshold; a sequence; perturbed input data; a predetermined step size; a step size; a predetermined scheme; a direction sign; a positive or a negative indicator for a direction sign; a visualization; an input image; an output image; a transformation representing a sequence of images; a display or a video comprised of multiple data or images which are based on perturbed input data; aspects of an input image; and a visualization of whether input data belongs more or less strongly to a classification.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for facilitating visualization of input data classifications, the method comprising:

obtaining, from a computer system, output data which includes a classification and a score that a corresponding set of input data belongs to one or more classifications;

computing an objective function based on the score and the input data;

computing a gradient of the objective function based on the input data; and in response to determining that the computed gradient is greater than a predetermined threshold:

perturbing the input data in a direction of or opposite to the computed gradient; and transmitting the perturbed input data to the computer system to obtain new output data; and displaying on a device a visualization of whether the input data belongs more or less strongly to a classification.

2. The method of claim 1, wherein in response to determining that the computed gradient is greater than the predetermined threshold, the method further comprises:

storing the perturbed input data in a sequence; and wherein in response to determining that the computed gradient is not greater than a predetermined threshold, the method further comprises:

returning the sequence to a user, which causes the user to visualize a transformation of the input data to determine which aspects of the input data most strongly affect the classification.

3. The method of claim 1, wherein the input data is perturbed based on one or more of:

a predetermined step size; and a step size which decreases at every iteration based on a predetermined scheme.

4. The method of claim 1, wherein the objective function is further based on scaling a logarithmic function of a positive real-value vector with a length equal to a number of classifications, and wherein the score is a probability that the corresponding set of input data belongs to the one or more classifications.

5. The method of claim 1, wherein the computer system is a machine learning system or a black box machine learning system which provides classifications for the set of input data.

6. The method of claim 1, wherein the computer system provides classifications for images, wherein the input data is an input image, wherein the output data is an output image, and wherein the visualization displayed on the device is of whether the input image belongs more or less strongly to the classification.

7. The method of claim 6, wherein in response to determining that the computed gradient is greater than the predetermined threshold, the method further comprises:

storing the perturbed input data in a sequence, wherein the stored sequence is a video comprised of multiple images based on the perturbed input data, and wherein the method further comprises one or more of:

playing the video by displaying on the device a transformation of the input image to an image which belongs more or less strongly to the classification; and returning the sequence to a user, which causes the user to visualize a transformation of the input image to determine which aspects of the input image most strongly affect the classification.

8. A computer system for facilitating visualization of input data classifications, the system comprising:

a processor; and a storage device storing instructions that when executed by the processor cause the processor to perform a method, the method comprising:

obtaining, from a remote computer system, output data which includes a classification and a score that a corresponding set of input data belongs to one or more classifications;

computing an objective function based on the score and the input data;

computing a gradient of the objective function based on the input data; and in response to determining that the computed gradient is greater than a predetermined threshold:

perturbing the input data in a direction of or opposite to the computed gradient; and transmitting the perturbed input data to the remote computer system to obtain new output data; and displaying on a device a visualization of whether the input data belongs more or less strongly to a classification.

9. The computer system of claim 8, wherein in response to determining that the computed gradient is greater than the predetermined threshold, the method further comprises:

storing the perturbed input data in a sequence; and wherein in response to determining that the computed gradient is not greater than a predetermined threshold, the method further comprises:

returning the sequence to a user, which causes the user to visualize a transformation of the input data to determine which aspects of the input data most strongly affect the classification.

10. The computer system of claim 8, wherein the input data is perturbed based on one or more of:

a predetermined step size; and a step size which decreases at every iteration based on a predetermined scheme.

11. The computer system of claim 8, wherein the objective function is further based on scaling a logarithmic function of a positive real-value vector with a length equal to a number of classifications, and wherein the score is a probability that the corresponding set of input data belongs to the one or more classifications.

12. The computer system of claim 8, wherein the remote computer system is a machine learning system or a black box machine learning system which provides classifications for the set of input data.

13. The computer system of claim 8, wherein the remote computer system provides classifications for images, wherein the input data is an input image, wherein the output data is an output image, and wherein the visualization displayed on the device is of whether the input image belongs more or less strongly to the classification.

14. The computer system of claim 13, wherein in response to determining that the computed gradient is greater than the predetermined threshold, the method further comprises:

storing the perturbed input data in a sequence, wherein the stored sequence is a video comprised of multiple images based on the perturbed input data, and wherein the method further comprises one or more of:

playing the video by displaying on the device a transformation of the input image to an image which belongs more or less strongly to the classification; and returning the sequence to a user, which causes the user to visualize a transformation of the input image to determine which aspects of the input image most strongly affect the classification.

15. A non-transitory computer-readable storage medium storing instructions that when executed by a computer cause the computer to perform a method, the method comprising:

obtaining, from a computer system, output data which includes a classification and a score that a corresponding set of input data belongs to one or more classifications;

computing an objective function based on the score and the input data;

computing a gradient of the objective function based on the input data; and in response to determining that the computed gradient is greater than a predetermined threshold:

perturbing the input data in a direction of or opposite to the computed gradient; and transmitting the perturbed input data to the computer system to obtain new output data; and displaying on a device a visualization of whether the input data belongs more or less strongly to a classification.

16. The storage medium of claim 15, wherein in response to determining that the computed gradient is greater than the predetermined threshold, the method further comprises:

storing the perturbed input data in a sequence; and wherein in response to determining that the computed gradient is not greater than a predetermined threshold, the method further comprises:

returning the sequence to a user, which causes the user to visualize a transformation of the input data to determine which aspects of the input data most strongly affect the classification.

17. The storage medium of claim 15, wherein the input data is perturbed based on one or more of:

a predetermined step size; and a step size which decreases at every iteration based on a predetermined scheme.

18. The storage medium of claim 15, wherein the objective function is further based on scaling a logarithmic function of a positive real-value vector with a length equal to a number of classifications, and wherein the score is a probability that the corresponding set of input data belongs to the one or more classifications.

19. The storage medium of claim 15, wherein the computer system provides classifications for images, wherein the input data is an input image, wherein the output data is an output image, and wherein the visualization displayed on the device is of whether the input image belongs more or less strongly to the classification.

20. The storage medium of claim 19, wherein in response to determining that the computed gradient is greater than the predetermined threshold, the method further comprises:

storing the perturbed input data in a sequence, wherein the stored sequence is a video comprised of multiple images based on the perturbed input data, and wherein the method further comprises one or more of:

playing the video by displaying on the device a transformation of the input image to an image which belongs more or less strongly to the classification; and returning the sequence to a user, which causes the user to visualize a transformation of the input image to determine which aspects of the input image most strongly affect the classification.

\* \* \* \* \*